(12) United States Patent
Naito et al.

(10) Patent No.: US 7,318,609 B2
(45) Date of Patent: Jan. 15, 2008

(54) CHUCK AND TUBE JOINT

(75) Inventors: Keiichiro Naito, Hiratsuka (JP);
Yoshimoto Taneya, Koshigaya (JP);
Taku Tomita, Katsushika-ku (JP);
Hitoshi Hamasaki, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 296 days.

(21) Appl. No.: 10/882,239

(22) Filed: Jul. 2, 2004

(65) Prior Publication Data

US 2005/0006896 A1 Jan. 13, 2005

(30) Foreign Application Priority Data

Jul. 9, 2003 (JP) ............... 2003-272543

(51) Int. Cl.
*F16L 21/06* (2006.01)
*F16L 37/00* (2006.01)

(52) U.S. Cl. ............... 285/322; 285/307; 285/316

(58) Field of Classification Search ............... 285/322, 285/323, 307, 316; 251/149.6
See application file for complete search history.

(56) References Cited

U.S. PATENT DOCUMENTS

| | | | | |
|---|---|---|---|---|
| 2,727,759 A | * | 12/1955 | Elliott ............... | 251/149.6 |
| 2,727,761 A | * | 12/1955 | Elliott et al. ............ | 285/83 |
| 3,727,952 A | * | 4/1973 | Richardson ............ | 285/101 |
| 4,017,139 A | * | 4/1977 | Nelson ............ | 439/352 |
| 4,195,812 A | * | 4/1980 | Norcross ............ | 251/148 |
| 4,508,369 A | * | 4/1985 | Mode ............ | 285/39 |
| 4,543,993 A | * | 10/1985 | Calvin et al. ............ | 137/614.03 |
| 4,664,420 A | * | 5/1987 | Demeri ............ | 285/86 |
| 4,776,614 A | * | 10/1988 | Marrison et al. ............ | 285/87 |
| 5,197,770 A | | 3/1993 | Knapp | |
| 5,284,369 A | * | 2/1994 | Kitamura ............ | 285/322 |
| 5,716,081 A | | 2/1998 | Leigh-Monstevens et al. | |
| 5,884,943 A | * | 3/1999 | Katzer et al. ............ | 285/38 |
| 6,065,779 A | * | 5/2000 | Moner et al. ............ | 285/23 |
| 6,283,443 B1 | | 9/2001 | Taneya | |
| 6,467,816 B1 | * | 10/2002 | Huang ............ | 285/316 |
| 6,557,904 B2 | * | 5/2003 | Naito ............ | 285/316 |
| 6,681,803 B2 | * | 1/2004 | Taneya et al. ............ | 137/614.03 |
| 6,883,779 B2 | * | 4/2005 | Borgmeier et al. ............ | 251/149.6 |
| 6,890,004 B2 | * | 5/2005 | Naito ............ | 285/93 |
| 2002/0047266 A1 | * | 4/2002 | Naito ............ | 285/322 |
| 2005/0110275 A1 | * | 5/2005 | Hama ............ | 285/322 |

FOREIGN PATENT DOCUMENTS

| | | |
|---|---|---|
| DE | 30 25 427 | 9/1981 |
| DE | 41 04 009 | 5/1992 |
| DE | 101 50 922 | 7/2002 |
| GB | 2 066 914 | 7/1981 |
| JP | 2000-314411 A | 11/2000 |

* cited by examiner

*Primary Examiner*—James M. Hewitt
(74) *Attorney, Agent, or Firm*—Paul A. Guss (57) ABSTRACT

A chuck includes an annular ring portion, a first engaging portion which extends along a central axis of the annular ring portion and which engages with the first tube joint member, and a second engaging portion which extends from the annular ring portion along the central axis of the annular ring portion and which elastically engages with a second tube joint member. A three-dimensionally shaped portion, which is an end of the second engaging portion, includes a pair of expanded portions on a metal plate. The annular ring portion is formed by rounding the metal plate with both ends, which are not fixed to one another so that both ends are displaceable circumferentially.

18 Claims, 10 Drawing Sheets

CHUCK AND TUBE JOINT

BACKGROUND OF THE INVENTION

1. Field of the Invention

The present invention relates to a chuck and a tube joint. In particular, the present invention relates to a chuck preferably usable to form a tube joint simply and inexpensively, and to the tube joint having the chuck.

2. Description of the Related Art

A tube joint comprises a tubular first tube joint member, a tubular second tube joint member which is to be coupled to the first tube joint member, a sleeve which is attached to a connecting portion between the first and second tube joint members and which is used to couple and uncouple the first and second tube joint members, a compressive coil spring which urges the sleeve in a direction to couple the first and second tube joint members, and an engaging means which engages the first and second tube joint members with each other.

The engaging means includes a plurality of steel balls provided in the first tube joint member, such that the steel balls are inserted into an annular groove formed on the surface of the second tube joint member for engagement. However, such engaging means using the steel balls as described above has a complicated structure, in which the assembling operation is complicated.

In view of the background as described above, a chuck provided on a first tube joint member is suggested as follows. The chuck has an annular ring portion, and extends along a central axis of the annular ring portion. Ends of the annular ring portion have roll-shaped engaging portions. The ends of the engaging portions are engaged with an annular groove of a second tube joint member (see, for example, Japanese Laid-Open Patent Publication No. 2000-314411). By using such a chuck, for example, it is possible to improve production efficiency of the tube joint and reduce production cost.

However, the above-mentioned chuck requires extra rolling process in production including a large number of winding operations, in order to sufficiently secure the strength of the ends. Further, the annular ring portion, which serves as a base portion of the engaging portions, is formed by deep drawing. Therefore, it is demanded to further reduce the cost for machining these portions.

SUMMARY OF THE INVENTION

An object of the present invention is to provide a chuck and a tube joint simply and inexpensively, but having sufficient strength.

According to the present invention, there is provided a chuck comprising: an annular ring portion into which at least a first member is inserted; a first engaging portion which extends from the annular ring portion along a central axis of the annular ring portion and which engages with the first member; and a second engaging portion which extends from the annular ring portion along the central axis of the annular ring portion and which elastically engages with a recess of a second member; and a three-dimensionally shaped portion on an end of the second engaging portion, the three-dimensionally shaped portion including a pair of expanded portions formed on a metal plate.

When the end of the second engaging portion has the three-dimensional shape obtained by combining the two expanded portions formed with the metal plate in the pair as described above, the chuck can be formed simply and inexpensively. Further, the end has a sufficient strength.

According to another aspect of the present invention, there is provided a chuck comprising an annular ring portion into which at least a first member is inserted; a first engaging portion which extends from the annular ring portion along a central axis of the annular ring portion and which makes engagement with the first member; and a second engaging portion which extends from the annular ring portion along the central axis of the annular ring portion and which elastically makes engagement with a second member; wherein the annular ring portion is formed by rounding the metal plate and the metal plate has both ends which are not fixed to one another so that both ends are displaceable in a circumferential direction.

When the annular ring portion is formed by rounding the metal plate as described above, then the strength is improved without generating any large strain which would be otherwise caused, for example, in the case of the deep drawing, and the annular ring portion can be formed simply and inexpensively. Both ends of the annular ring portion are not fixed to one another. Therefore, it is unnecessary to perform any treatment such as welding to effect the connection. Further, the diameter of the annular ring portion is elastically expandable and shrinkable. Therefore, it is easy to install the annular ring portion to the first member.

In the chuck constructed as described above, it is also preferable that the first engaging portion includes a plurality of plate tabs which are provided on the annular ring portion; and the second engaging portion includes a plurality of plate spring portions which are provided on the annular ring portion and which are formed to be more lengthy than the plate tabs of the first engaging portion.

In the chuck constructed as described above, it is also preferable that the plate spring portion has an inclined portion which is inclined in a direction directed toward the central axis of the annular ring portion.

In the chuck constructed as described above, it is also preferable that plate tabs, which constitute the first engaging portion, are provided on the annular ring portion at equal intervals; and plate spring portions, which constitute the second engaging portion, are provided on the annular ring portion at equal intervals at positions different from those of the plate tabs.

According to still another aspect of the present invention, there is provided A tube joint comprising: a first tube joint member; a second tube joint member which is connectable to the first tube joint member; a sleeve which is attached to a connecting portion between the first and second tube joint members and which is provided to couple and uncouple the first and second tube joint members; a resilient member which urges the sleeve in a direction to couple the first and second tube joint members; and a chuck which engages the first tube joint member with the second tube joint member, wherein the chuck comprises: an annular ring portion into which the first tube joint member is inserted; a first engaging portion which extends from the annular ring portion along a central axis of the annular ring portion and which engages with the first tube joint member; and a second engaging portion which extends from the annular ring portion along the central axis of the annular ring portion and which elastically engages with the second tube joint member, wherein the annular ring portion is formed by rounding a metal plate so that both ends of the metal plate are disposed approximately close to one another, and the both ends are not fixed to one another so that the both ends are displaceable in a circumferential direction.

According to still another aspect of the present invention, there is provided A tube joint comprising: a first tube joint member; a second tube joint member which is connectable to the first tube joint member; a sleeve which is attached to a connecting portion between the first and second tube joint members and which is provided to couple and uncouple the first and second tube joint members; a resilient member which urges the sleeve in a direction to couple the first and second tube joint members; and a chuck which engages the first tube joint member with the second tube joint member, wherein the chuck comprises: an annular ring portion into which the first tube joint member is inserted; a first engaging portion which extends from the annular ring portion along a central axis of the annular ring portion and which engages with the first tube joint member; and a second engaging portion which extends from the annular ring portion along the central axis of the annular ring portion and which elastically engages with the second tube joint member, wherein an end of the second engaging portion engages with a recess of the second tube joint member and forms a three-dimensionally shaped portion including a pair of expanded portions on a metal plate.

As described above, the chuck, which is used for the tube joint, has the end having the three-dimensional shape formed by combining the two expanded portions, and/or the chuck has the annular ring portion formed by rounding the metal plate. Therefore, the end and/or the annular ring portion is constructed simply and inexpensively. Further, the end and/or the annular ring portion has the sufficient strength.

It is also preferable that the tube joint described above further comprises a lock mechanism which selectively limits the displacement of the sleeve. In this arrangement, the lock mechanism is preferably constructed as follows. That is, the lock mechanism has a cylindrical holder with which the front portion of the first tube joint member is covered, and a cylindrical lock member which makes sliding movement on the outer circumference of the holder. The lock member has at least two projections which protrude inwardly. The holder has a guide groove which is formed to have a shape such that the lock member makes sliding movement while making rotation in forward and rearward directions on the circumferential surface of the latter half portion of the holder when the lock member is rotated.

Accordingly, it is possible to avoid any unexpected displacement of the sleeve member after the first tube joint member and the second tube joint member are coupled to one another. Further, it is possible to tightly couple the first and second tube joint members.

The holder is preferably constructed as follows. That is, the holder is provided at its front end with a guide portion which has an outer diameter expanded outwardly so that the outer diameter is approximately the same as an inner diameter of the rear portion of the sleeve member and which makes contact with the inner wall of the sleeve member. The guide portion may be allowed to extend frontwardly along the inner wall of the sleeve member. Accordingly, it is possible to smoothen and stabilize the sliding movement of the sleeve member in reciprocation.

When a detachable protecting member, which is made of synthetic resin, is provided at an end of the sleeve member, it is possible to protect the end from any force caused by the shock.

The two expanded portions may have different shapes on outer and inner sides. The outer expanded portion may have a shape which is easily depressed to facilitate the displacement of the second engaging portion. The inner expanded portion may have a shape which is easily engageable with the recess.

When the annular ring portion is diametrally expanded elastically to be installed to the first member, the annular ring portion can be reliably installed to the first tube joint member without any gap.

According to the chuck and the tube joint concerning the present invention, the chuck can be constructed simply and inexpensively, and the chuck has the sufficient strength.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An explanation will be made below with reference to FIGS. 1 to 10 about an illustrative embodiment of the chuck according to the present invention and an illustrative embodiment in which the chuck according to the embodiment of the present invention is applied to the tube joint.

Figure 1:
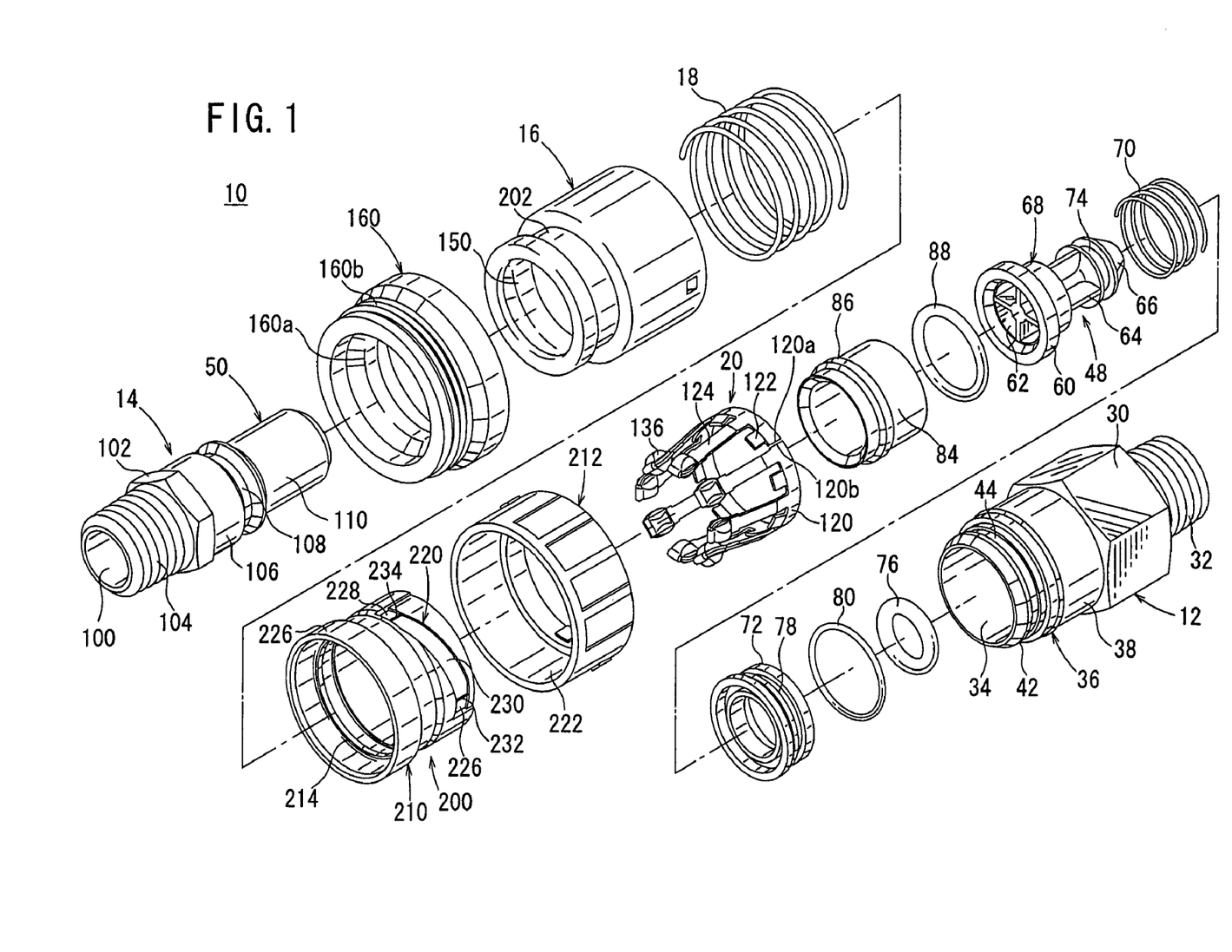
FIG. 1 is an exploded perspective view illustrating an arrangement of a tube joint according to an embodiment of the present invention.

As shown in FIG. 1, a tube joint 10 according to the embodiment of the present invention comprises a cylindrical first tube joint member 12 which is made of metal, a cylindrical second tube joint member 14 which is made of metal and which is connectable to the first tube joint member 12, a sleeve 16 which is made of metal and which is attached to a connecting portion between the first and second tube joint members 12, 14 to couple and uncouple the first and second tube joint members 12, 14, a compressive coil spring 18 which urges the sleeve 16 in a direction to connect the first and second tube joint members 12, 14 to one another, and a chuck 20 according to the embodiment of the present invention which engages the first and second tube joint members 12, 14 with each other.

The following description will be made based on the following assumption in order to specify the directions. That is, the portion of the first tube joint member 12, into which the second tube joint member 14 is inserted, is referred to as the front portion, and the direction, which is directed toward the second tube joint member 14 as viewed from the first tube joint member 12, is referred to as the frontward direction. The portion of the second tube joint member 14, which is inserted into the first tube joint member 12, is referred to as the rear portion, and the direction, which is directed toward the first tube joint member 12 as viewed from the second tube joint member 14, is referred to as the rearward direction.

The first tube joint member 12 has a structure of a bolt member in which a central portion 30 thereof is formed to be hexagonal cylindrical, and a hollow portion 34 is provided. An unillustrated tube is connected to a male thread portion 32 disposed rearwardly. The first tube joint member 12 has a front portion 36 thereof which includes a root portion 38 having a large diameter. An annular groove 44 is formed circumferentially at a small diameter portion 42 disposed frontwardly as compared with the root portion 38.

Figure 2:
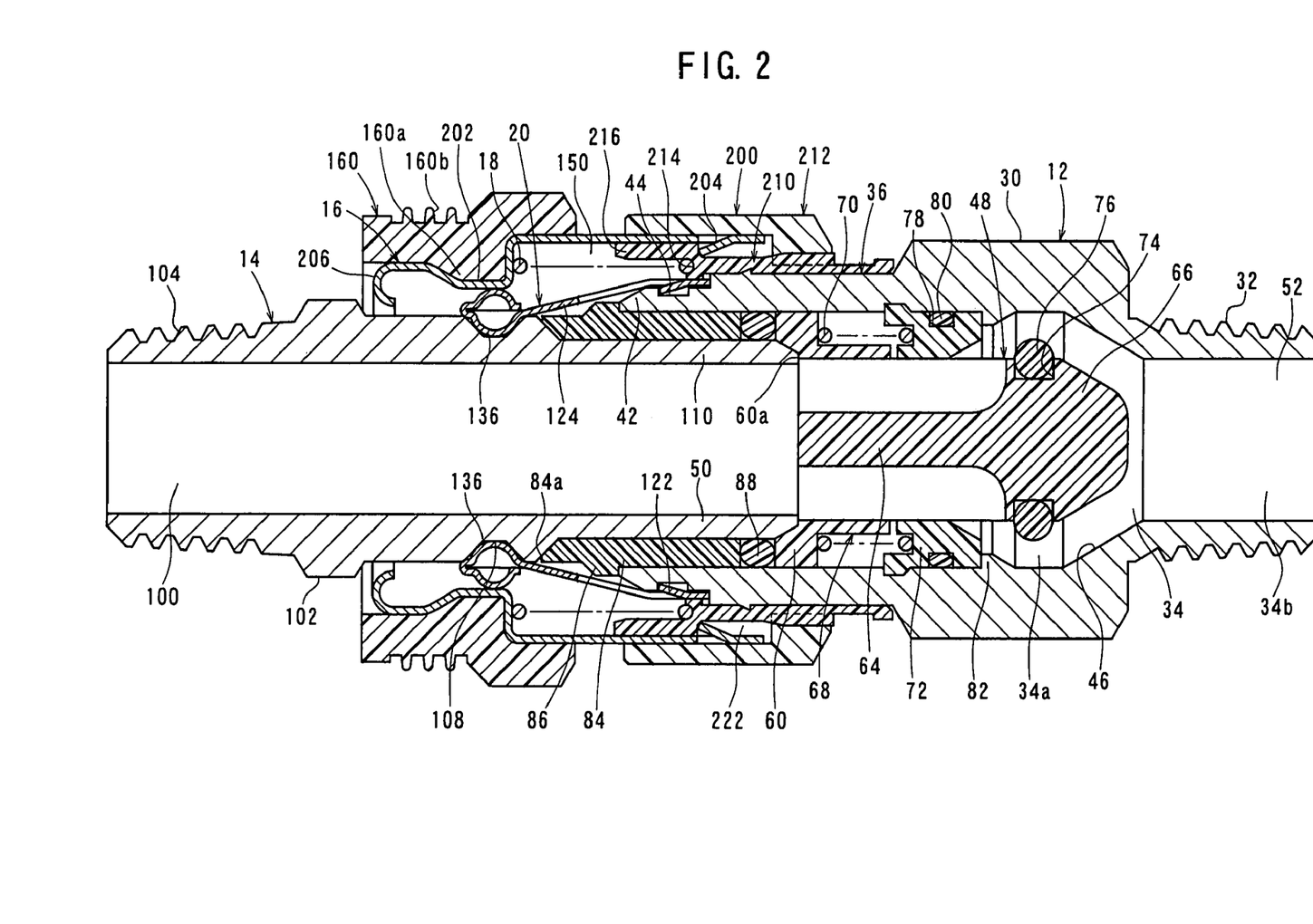
FIG. 2 is a longitudinal sectional view illustrating an arrangement of the tube joint according to the embodiment of the present invention, especially an arrangement in a state in which a second tube joint member is inserted into a first tube joint member.

As shown in FIG. 2, the first tube joint member 12 is formed with the hollow portion 34 which penetrates in the axial direction. The space, which is formed in the hollow portion 34 over a range from the opening of the front end to the portion corresponding to the starting end of the male thread portion 32, is formed as an accommodating space 34a into which at least a valve plug 48 and a part of a rear portion 50 of the second tube joint member 14 are inserted. The space, which is formed over a range from the starting end of the male thread portion 32 to an opening 52 at the rear of the hollow portion 34, is formed as a through-hole 34b.

The diameter of the accommodating space 34a is set to be larger than the diameter of the through-hole 34b. In particular, the portion, which is disposed between the accommodating space 34a and the through-hole 34b, is formed as a tapered surface 46 which is diametrally shrunk toward the through-hole 34b.

As shown in FIG. 1, the valve plug 48 comprises a main valve body 68 integrally formed with a cylindrical base 60, a support member 64 having a crucial cross portion which extends rearwardly from a hollow portion 62 of the base 60, and a round projection 66 which is formed at the rear end of the support member 64, and a movable member 72 which is installed to the main valve body 68 with a compressive coil spring 70 intervening therebetween. All of these parts are made of synthetic resin. An O-ring 76 is installed to an annular groove 74 which is provided at the root portion of the projection 66 of the main valve body 68. An O-ring 80 is installed to an annular groove 78 which is provided on the movable member 72.

Figure 3:
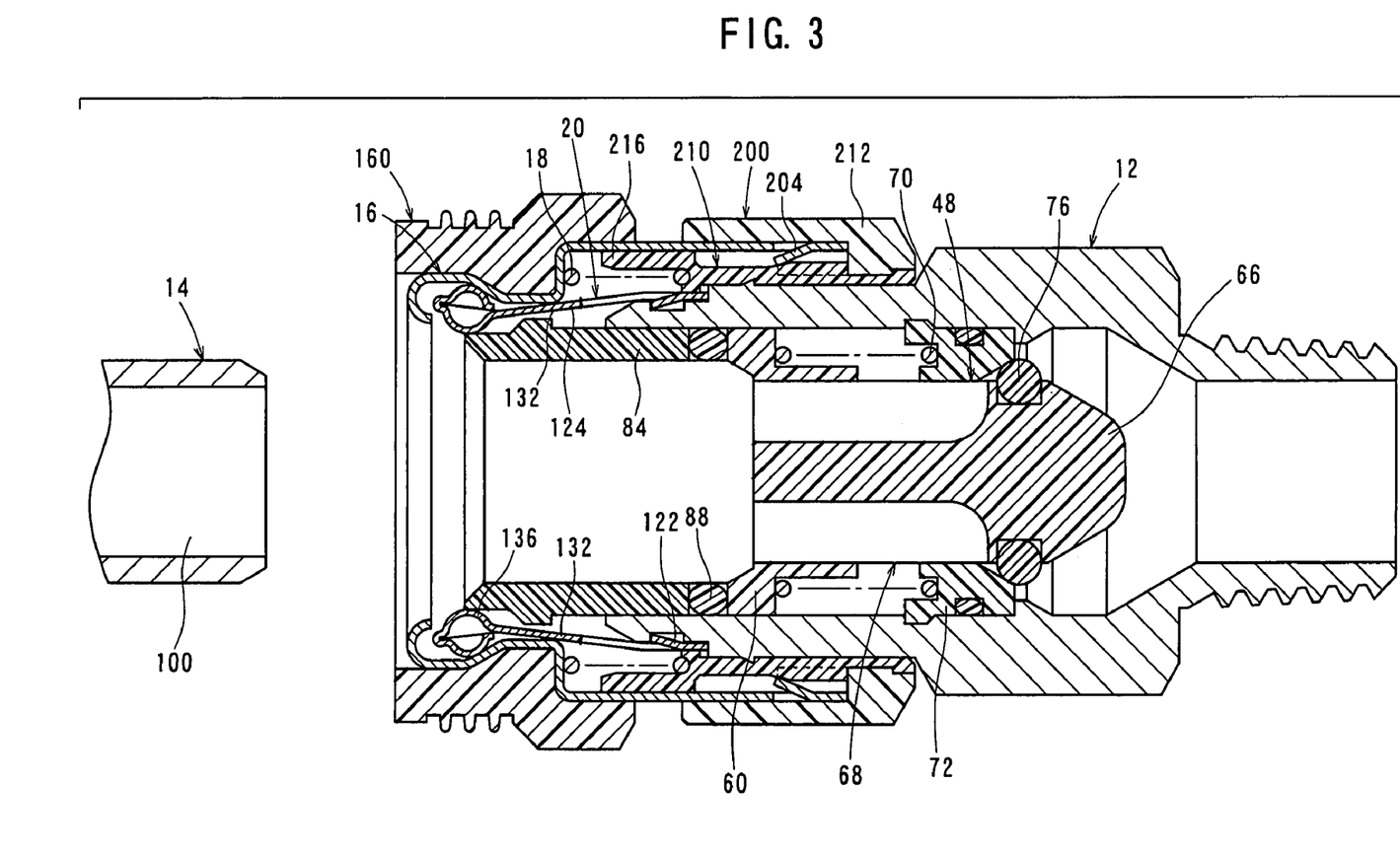
FIG. 3 is a longitudinal sectional view illustrating an arrangement of the tube joint according to the embodiment of the present invention, especially an arrangement in a state in which the second tube joint member is not inserted into the first tube joint member, and a sleeve is displaced rearwardly.

As shown in FIG. 3, the valve plug 48 is constructed as follows. That is, in a state in which any external force (for example, any external force exerted by fingers of a user) is not applied, the root portion of the projection 66 of the main valve body 68 abuts against the rear end inner wall of the movable member 72 with the O-ring 76 intervening therebetween by being resiliently urged by the compressive coil spring 70 to secure the sealing performance between the main valve body 68 and the movable member 72 by the aid of the O-ring 76. That is, the valve plug 48 is in the closed state.

As shown in FIG. 2, when the base 60 is moved in the direction to make relative approach to the movable member 72 against the urging force of the compressive coil spring 70, the root portion of the projection 66 is separated from the rear end inner wall of the movable member 72. Therefore, the space disposed on the side of the projection 66 is communicated with the space disposed on the side of the base 60 by the aid of the support member 64. Accordingly, the valve plug 48 is in the open state.

The valve plug 48 is inserted into the accommodating space 34a of the first tube joint member 12, and it is fitted into the accommodating space 34a in a state in which the main valve body 68 is movable in the frontward and rearward directions. The movable member 72 of the valve plug 48 is prevented from any further insertion (insertion in the direction toward the through-hole 34b) by an annular projection 82 provided on the inner wall of the accommodating space 34a.

A cylindrical collar 84 is attached along the front end inner wall to the accommodating space 34a. The collar 84 has an annular projection 86 formed on the outer circumferential surface. The annular projection 86 functions as a stopper when the collar 84 is inserted into the first tube joint member 12. An O-ring 88 is interposed between the rear end surface of the collar 84 and the base 60 of the main valve body 68. Accordingly, the sealing performance is secured between the collar 84 and the base 60.

The collar 84 has its outer diameter which is set to be approximately equal to the inner diameter of the front portion 36 of the first tube joint member 12. Therefore, when the collar 84 is inserted into the opening of the front portion 36 of the first tube joint member 12, the collar 84 can be fitted to the first tube joint member 12.

As shown in FIG. 3, in a state in which the second tube joint member 14 is not inserted into the first tube joint member 12, the base 60 of the main valve body 68, the collar 84, and the O-ring 88 intervening therebetween are displaced frontwardly by being urged by the compressive coil spring 70 of the valve plug 48, and plate spring portions 132 of the chuck 20 are pressed by the front end of the collar 84 in directions in which the plate spring portions 132 are opened mutually outwardly as described later on. In this situation, the O-ring 76, which is provided on the projection 66 of the valve plug 48, abuts against the inner wall of the movable member 72. Thus, the valve plug 48 is in the closed state.

As shown in FIGS. 1 and 2, the second tube joint member 14 has a hollow portion 100 which is formed therein and which penetrates from the front end opening to the rear end opening. The second tube joint member 14 has its central portion 102 which is formed to be hexagonal cylindrical. A male thread is formed at a front portion 104 thereof. The second tube joint member 14 has a structure of a bolt member having the hollow portion 100. An unillustrated tube is connected to the front portion (male thread portion) 104. The second tube joint member 14 has an annular groove (recess) 108 which is formed circumferentially at a root portion 106 having a large diameter of the rear portion 50 thereof.

A small diameter portion 110, which is disposed at the rear portion 50 of the second tube joint member 14, has its outer diameter which is set to be approximately the same as the inner diameter of the collar 84. The length thereof in the axial direction is set to be approximately the same as the distance from a stepped end surface 60a of the base 60 of the main valve body 68 to the front end surface 84a of the collar 84.

Figure 4:
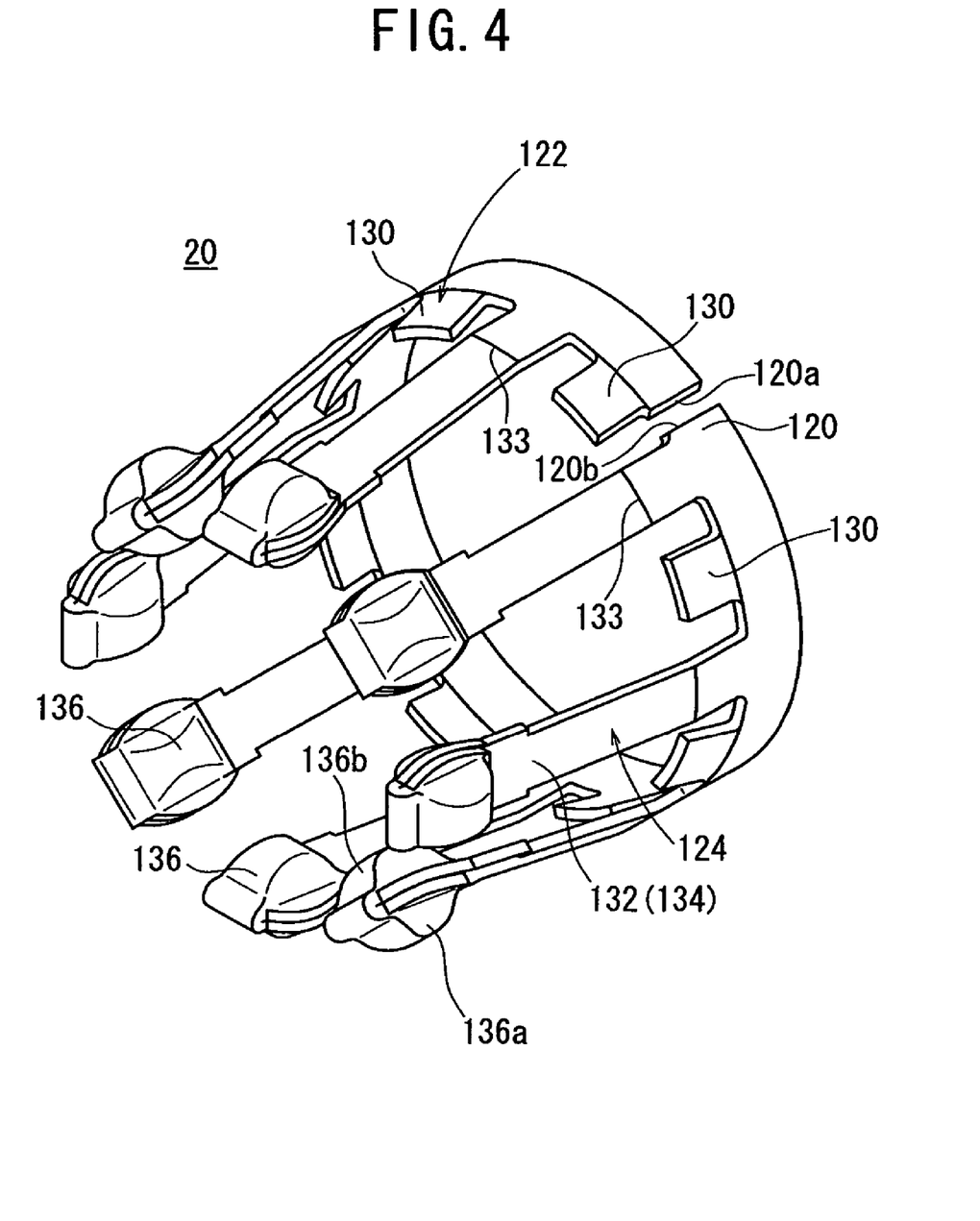
FIG. 4 is a perspective view illustrating an arrangement of a chuck according to the embodiment of the present invention.
Figure 5:
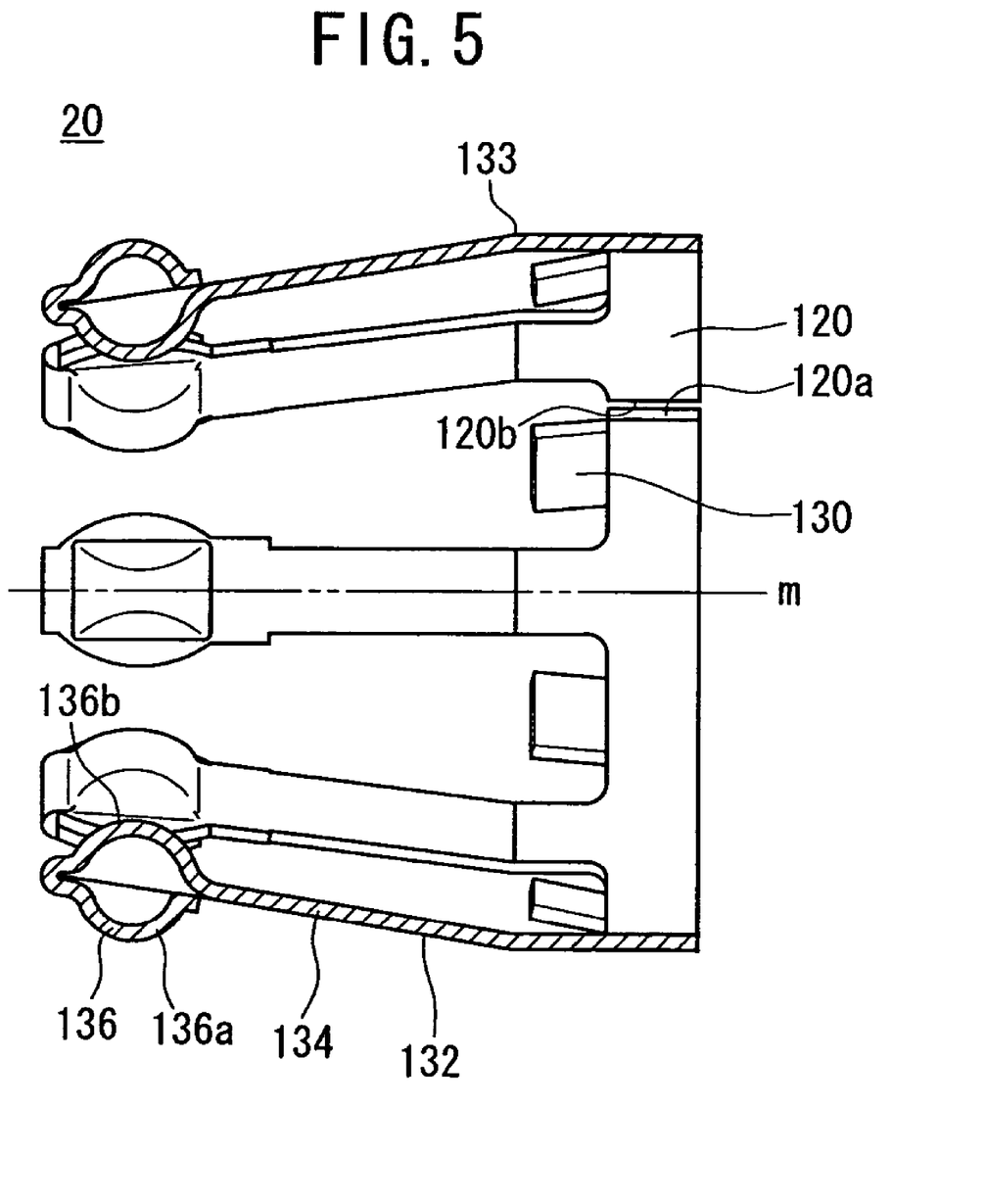
FIG. 5 is a longitudinal sectional view illustrating an arrangement of the chuck according to the embodiment of the present invention.

As shown in FIGS. 4 and 5, the chuck 20 according to the embodiment of the present invention is formed by processing a thin metal plate to have an annular ring portion 120 into which the first tube joint member 12 is inserted, first engaging portions 122 which extend from the annular ring portion 120 along the central axis m (see FIG. 5) of the annular ring portion 120 and which are engageable with the first tube joint member 12, and second engaging portions 124 which extend from the annular ring portion 120 along the central axis m of the annular ring portion 120 and which are elastically engageable with the second tube joint member 14.

The annular ring portion 120 is formed by cutting out the thin metal plate as the material and rounding the metal plate. Both ends 120a, 120b of the annular ring portion 120 are not fixed to one another so that both ends 120a, 120b are displaceable in the circumferential direction. The inner diameter of the annular ring portion 120 is set to be slightly smaller than the outer diameter of the small diameter portion 42 of the front portion 36 of the first tube joint member 12. The annular ring portion 120 is installed to the root portion of the small diameter portion 42 while slightly expanding the diameter of the annular ring portion 120 in an elastic manner. Accordingly, the annular ring portion 120 can be reliably installed to the root portion without any gap. It is also allowable that portions of both ends 120a, 120b may be overlapped with each other.

The annular ring portion 120 can be formed by rounding the metal plate. Therefore, unlike the deep drawing or the like, no large strain is generated. Therefore, the annular ring portion 120 can be formed simply and inexpensively, and it has a high strength and a long service life.

The first engaging portions 122 include a plurality of plate tabs 130 which are provided on the annular ring portion 120. The second engaging portions 124 are provided on the annular ring portion 120. The second engaging portions 124 include a plurality of plate spring portions 132 which are formed to be longer than the plate tabs 130 of the first engaging portions 122.

The plate tabs 130 of the first engaging portions 122 are provided at equal intervals on the annular ring portion 120. The plate spring portions 132 of the second engaging portions 124 are provided at equal intervals on the annular ring portion 120 at positions different from those of the plate tabs 130. That is, the first engaging portions 122 and the second engaging portions 124 are arranged alternately on the annular ring portion 120, and they are engageable with the first tube joint member 12 and the second tube joint member 14 in a well-balanced manner. FIG. 4 is illustrative of a case in which the eight plate tabs 130 are provided at equal intervals on the annular ring portion 120 at positions of point symmetry with respect to the center of the annular ring portion 120, and the eight plate spring portions 132 are provided at equal intervals at positions of point symmetry with respect to the center of the annular ring portion 120.

Each of the plate spring portions 132 has an inclined portion 134 which is inclined from a bent portion 133 in a direction directed toward the central axis m of the annular ring portion 120. The end is a three-dimensionally shaped portion 136 which is substantially spherical and capsule-shaped, and has a high strength. The three-dimensionally shaped portion 136 can be formed conveniently and inexpensively, for example, such that two expanded portions 136a, 136b (see FIG. 5) are formed by plastically deforming the metal plate, and an intermediate portion of the two expanded portions 136a, 136b is bent and folded. In this arrangement, the deformation with respect to the metal plate as the material is relatively small for the expanded portions 136a, 136b. Therefore, the metal fatigue is decreased, and the service life becomes long.

The two expanded portions 136a, 136b may have different shapes. In this arrangement, the expanded portion 136a, which is disposed on the outer side, may have a shape which is easily pressed by the bent portion 202 of the sleeve 16 so that the second engaging portion is easily displaceable. The expanded portion 136b, which is disposed on the inner side, may have a shape which is easily engageable with the cross-sectional shape of the annular groove 108.

In the tube joint 10 according to the embodiment of the present invention, the annular groove 108 is a relatively deep groove. Therefore, the expanded portion 136b on the inner side is formed to be larger than the expanded portion 136a on the outer side.

As shown in FIG. 2, when the second tube joint member 14 is inserted into the first tube joint member 12 in a state in which the chuck 20 is installed to the small diameter portion 42 of the front portion 36 of the first tube joint member 12, the three-dimensionally shaped portions 136 are engaged with the annular groove 108 formed at the rear portion 50 of the second tube joint member 14 by the aid of the elasticity of the plate spring portions 132.

In this situation, the plate tabs 130 of the first engaging portions 122 are engaged with the annular groove 44 at the front portion 36 of the first tube joint member 12. Accordingly, the chuck 20 is fixed to the first tube joint member 12.

With reference to FIGS. 1 and 2 again, the sleeve 16 is formed to have a thin-walled cylindrical shape by means of the metal press forming. The sleeve 16 has a hollow portion 150 which penetrates from the front end opening to the rear end opening. The hollow portion 150 has a diameter of such a degree that the hollow portion 150 can be inserted into the connecting portion between the first tube joint member 12 and the second tube joint member 14.

A bent portion 202, which protrudes inwardly and which is provided to press the three-dimensionally shaped portions 136 of the chuck 20 installed to the first tube joint member 12 in the direction toward the axis of the second tube joint member 14, is integrally formed in the vicinity of the front end of the sleeve 16. An engaging tab 204, which is partially bent inwardly and which is engageable with a holder 210 of a lock mechanism 200 as described later on, is integrally formed in the vicinity of the rear end of the sleeve 16.

The front end 206 of the sleeve 16 is formed and bent so that the front end 206 is rounded inwardly, for the following reason. That is, taking the handling convenience into consideration, it is intended that the second tube joint member 14 can be smoothly inserted into the hollow portion 150 of the sleeve 16 (more precisely, into the hollow portion 34 of the first tube joint member 12), and the strength of the sleeve 16 is successfully increased.

A protective cap (protecting member) 160 is provided at the front end of the sleeve 16. The protective cap 160 is cylindrical, and has an annular projection 160a which is formed on the inner wall and which is fitted to the bent portion 202 of the sleeve 16. Therefore, the protective cap 160 is not unexpectedly disengaged. The front end of the protective cap 160 is formed so that the front end slightly protrudes frontwardly as compared with the front end 206 of the sleeve 16. Thus, it is possible to protect the front end 206 from any obstacle.

The protective cap 160 is formed of a material of a relatively soft repulsive member. More specifically, it is preferable to use synthetic resin materials such as urethane rubber, fluoro rubber, and weather-resistant NBR (acrylonitrile-butadiene rubber). In particular, the weather-resistant NBR is at low cost and it is excellent in mechanical strength and weather resistance owing to the action of the additive.

The protective cap 160 can be attached/detached without using any special tool, because the protective cap 160 is formed of the soft material.

The protective cap 160 has a shape to cover the front portion of the sleeve 16. Therefore, it is possible to protect the sleeve 16 against any external shock exerted, for example, when the tube joint 10 falls or drops. Therefore, the sleeve 16 involves no fear of breakage and deformation even when the sleeve 16 has the thin-walled structure.

The protective cap 160 hardly slides on the fingers of the operator, because the protective cap 160 is made of the resin material. Further, the protective cap 160 is easily gripped, because a plurality of thin annular grooves 160b are provided at narrow intervals on the outer circumference. It is easy to operate the sleeve 16.

When the second tube joint member 14 is inserted into the first tube joint member 12, the sleeve 16 is always urged repulsively by the compressive coil spring 18 in the direction to make separation from the first tube joint member 12 toward the second tube joint member 14 in a state in which no external force is exerted. In this situation, the three-dimensionally shaped portions 136 of the chuck 20 are pressed inwardly by the bent portion 202 to the second tube joint member 14.

In this situation, the rear end of the second tube joint member 14 presses the base 60 of the main valve body 68 rearwardly. Therefore, the valve plug 48 is in the open state.

On the other hand, the lock mechanism 200 has the cylindrical holder 210 which covers the front portion 36 of the first tube joint member 12, and a cylindrical lock member 212 which makes sliding movement on the outer circumference of the holder 210. The holder 210 has an annular groove 214 which is formed at the front end and into which the other end of the compressive coil spring 18 is fitted.

The front end of the holder 210 is expanded outwardly so that the outer diameter thereof is substantially the same as the inner diameter of the rear portion of the sleeve 16. Further, the front end of the holder 210 has a guide portion 216 which makes contact with the inner wall of the sleeve 16. The guide portion 216 extends frontwardly along the inner wall of the sleeve 16. Accordingly, the sleeve 16 is slidable in the frontward and rearward directions smoothly and stably.

As shown in FIG. 3, the gap, which corresponds to the relative movement distance for the first tube joint member 12 and the sleeve 16, is formed between the rear end surface of the guide portion 216 of the holder 210 and the front end surface of the engaging tab 204 of the sleeve 16 in a state in which the second tube joint member 14 is not inserted into the first tube joint member 12 and the sleeve 16 is displaced rearwardly.

Figure 6:
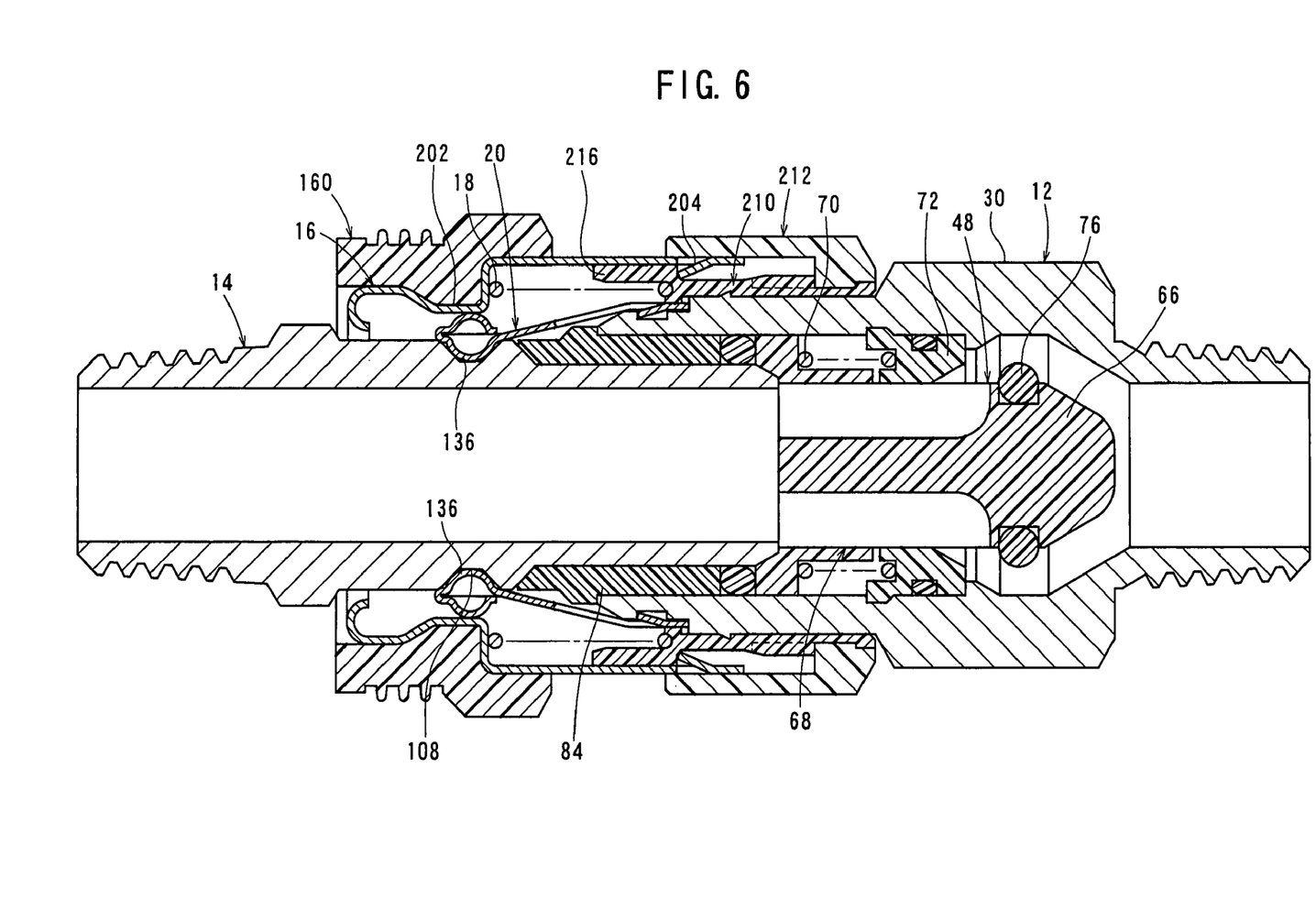
FIG. 6 is a sectional view illustrating an arrangement of the tube joint according to the embodiment of the present invention.

As shown in FIG. 6, when the second tube joint member 14 is inserted into the first tube joint member 12, then the first tube joint member 12 is moved rearwardly relatively with respect to the sleeve 16, and the front end surface of the engaging tab 204 of the sleeve 16 abuts against the rear end surface of the guide portion 216 of the holder 210.

As shown in FIG. 1, two guide grooves 220 are provided on the latter half portion of the holder 210. Details of the guide grooves 220 will be described later on.

On the other hand, the lock member 212 is formed to have a cylindrical shape, for example, with synthetic resin. The lock member 212 has a hollow portion 222 so that the rear portion of the sleeve 16 and the holder 210 of the lock mechanism 200 can be inserted thereinto. The inner diameter of the hollow portion 222 in an area ranging from the front end portion to the central portion is set so that the rear portion including the engaging tab 204 of the sleeve 16 can be covered. The inner diameter of the rear portion of the hollow portion 222 is set to be smaller than the inner diameter of the area ranging from the front end portion to the central portion of the hollow portion 222.

Figure 7:
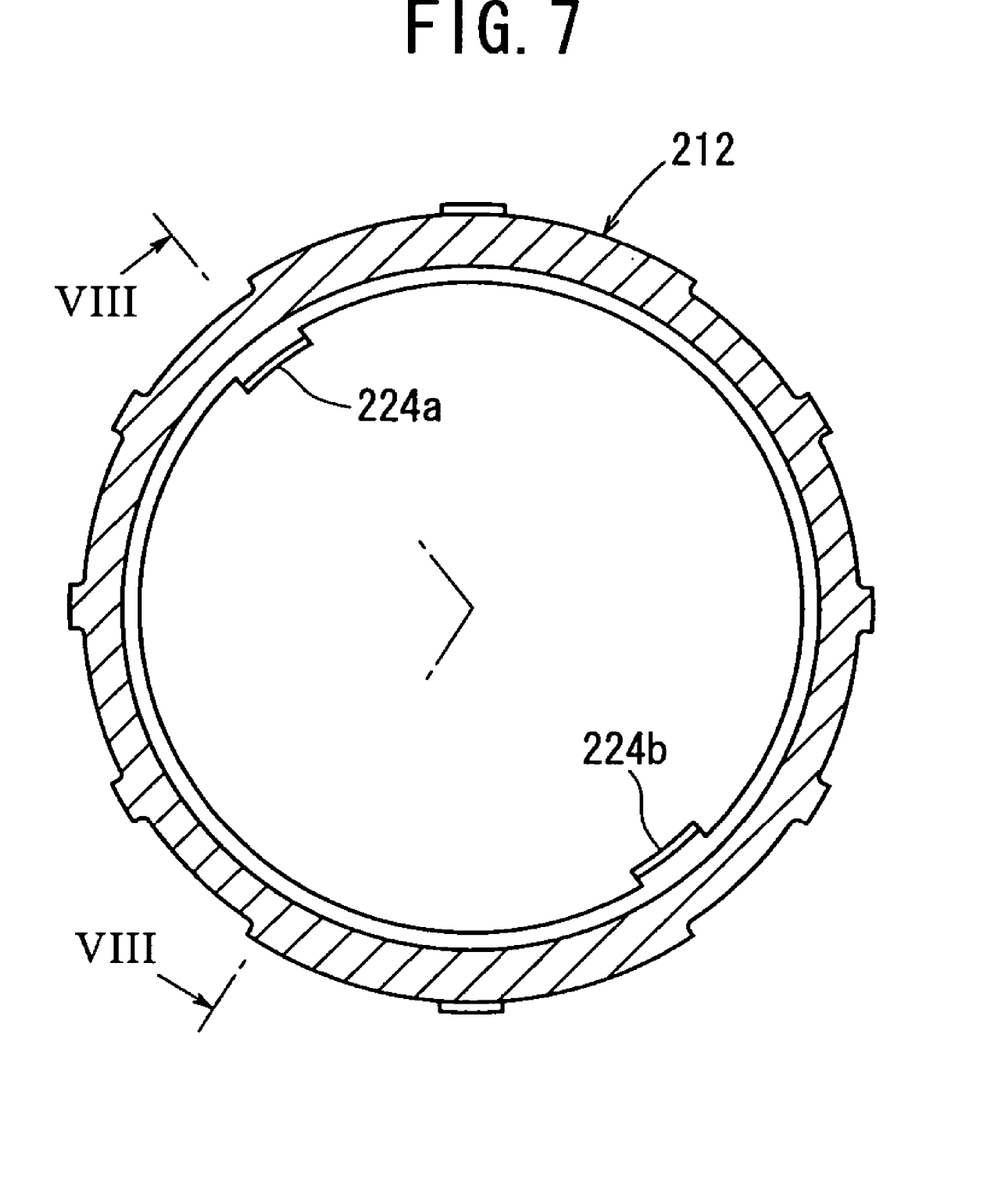
FIG. 7 is a lateral sectional view illustrating a lock member of a lock mechanism.
Figure 8:
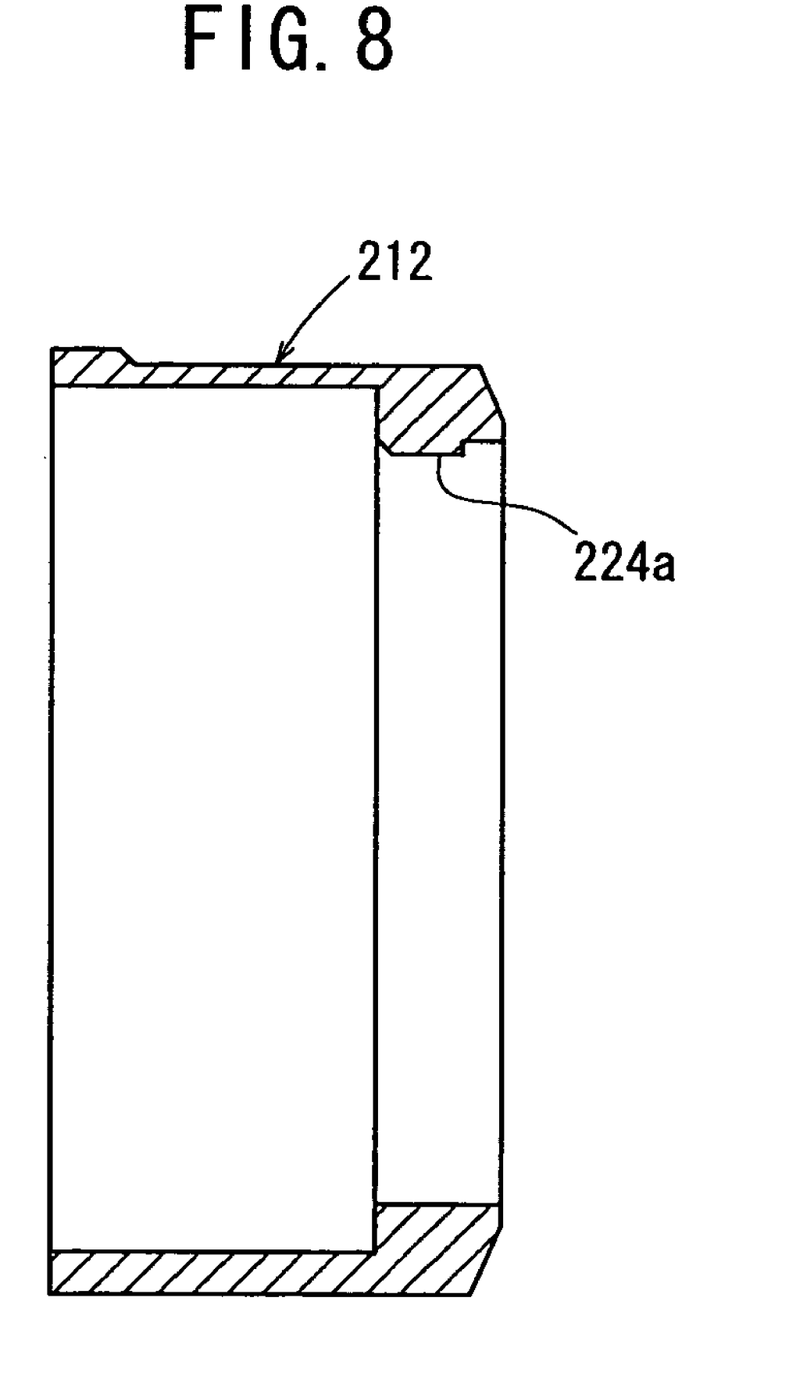
FIG. 8 is a sectional view taken along a line VIII-VIII shown in FIG. 7.

In particular, as shown in FIGS. 7 and 8, two projections 224a, 224b, which protrude inwardly and which have rectangular end surfaces, are integrally formed on the inner wall of the rear portion of the lock member 212. The two projections 224a, 224b are formed at positions at which they are opposed to one another.

The guide grooves 220, which are formed at the latter half portion of the holder 210, are formed so that the lock member 212 makes sliding movement while making rotation in the frontward and rearward directions on the circumferential surface of the latter half portion of the holder 210 when the lock member 212 is rotated.

It is now defined that the position of the lock member 212, at which the rear end of the lock member 212 is approximately coincident with the rear end of the holder 210, is the initial position. The guide grooves 220 are formed in oblique directions along the outer circumference of the latter half portion of the holder 210. When the lock member 212 is rotated clockwise starting from a state in which the lock member 212 is at the initial position, then the lock member 212 makes sliding movement while making rotation toward the rear end of the sleeve 16, and the sliding movement is stopped at a stage at which the lock member 212 arrives at the position (terminal end position) disposed approximately to the rear end of the sleeve 16.

Figure 9:
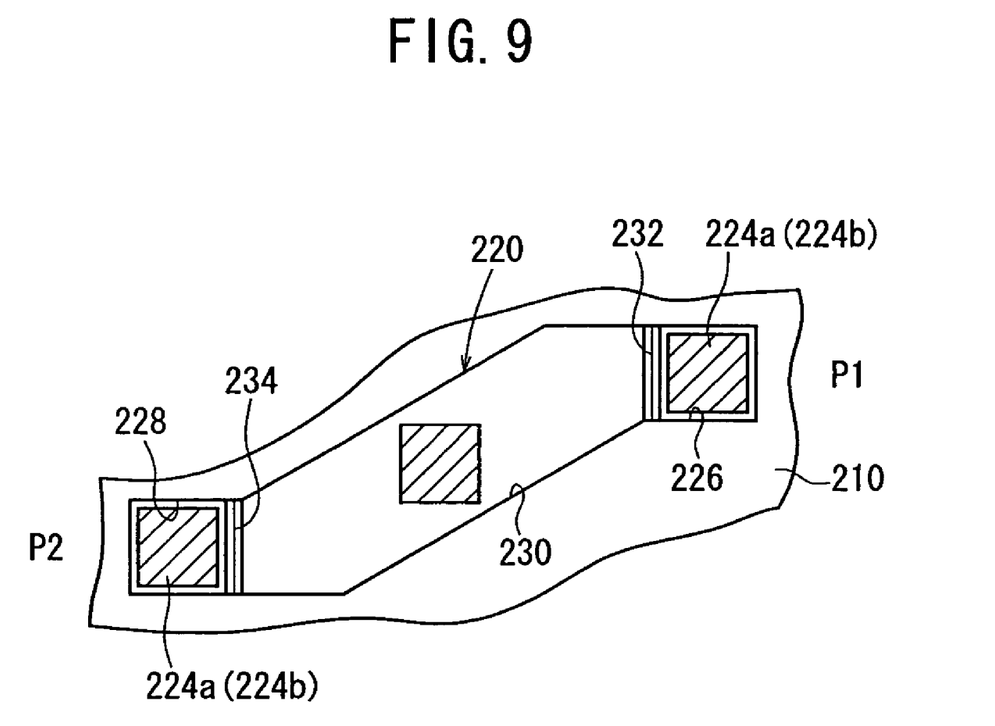
FIG. 9 illustrates the principle of operation of the lock mechanism, especially operation of projections of the lock member with respect to a guide groove formed on a holder as viewed in a plan view.

As shown in FIG. 9, the guide groove 220 includes a first groove 226 which has, for example, a rectangular shape and into which each of the projections 224a, 224b is inserted at each of portions at which the respective projections 224a, 224b of the lock member 212 are located when the lock member 212 is at the initial position P1, a second groove 228 which has, for example, a rectangular shape and into which each of the projections 224a, 224b is inserted at each of portions at which the respective projections 224a, 224b of the lock member 212 are located when the lock member 212 is at the terminal end position P2, and a communication groove 230 which makes communication between the first groove 226 and the second groove 228 and which is formed to extend in the oblique direction with respect to the outer circumference of the holder 210.

Figure 10:
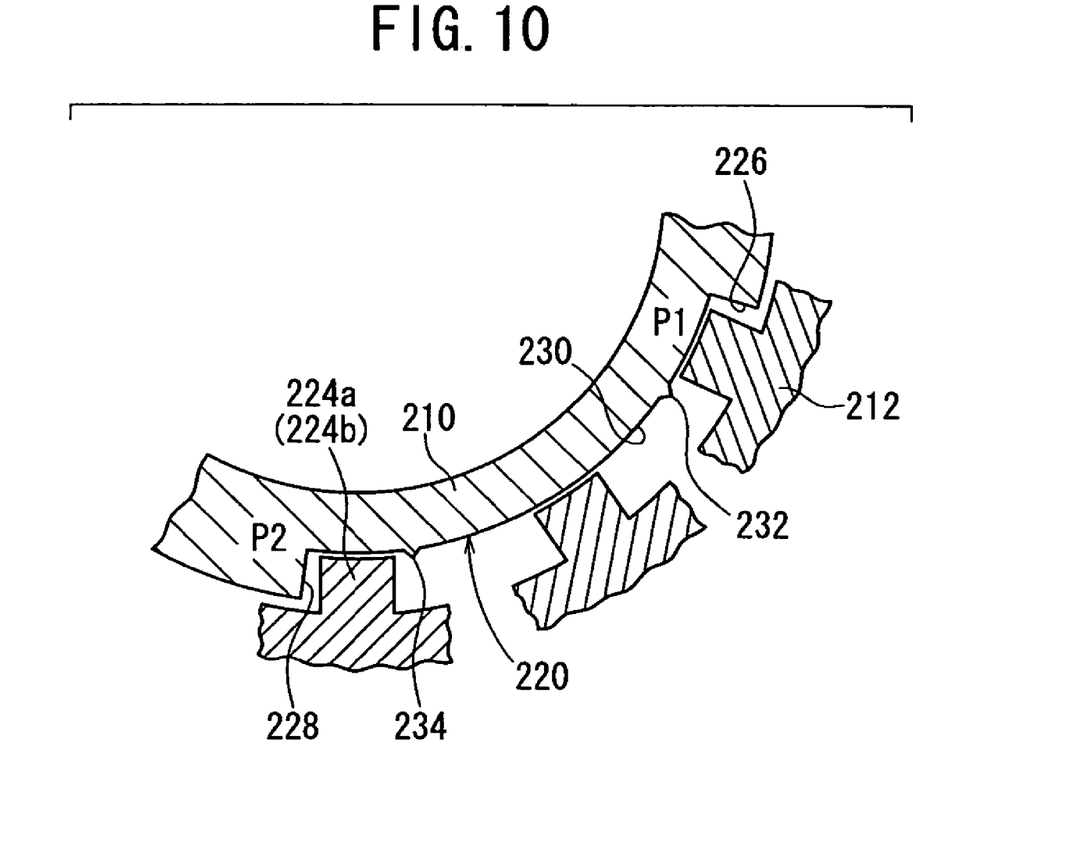
FIG. 10 illustrates the principle of operation of the lock mechanism, especially operation of the projections of the lock member with respect to the guide groove formed on the holder as viewed in a side view.

As shown in FIGS. 1 and 10, a first minute projection 232, which has a substantially triangular cross portion, is formed between the first groove 226 and the communication groove 230 on the bottom of the guide groove 220. Further, a second minute projection 234, which has a substantially triangular cross portion, is formed between the second groove 228 and the communication groove 230 on the bottom of the guide groove 220. Therefore, the displacement of the lock member 212 is limited by the first minute projection 232 or the second minute projection 234 when the lock member 212 is located at the initial position P1 or at the terminal end position P2. When no external force is applied, the lock member 212 is retained at the initial position P1 or at the terminal end position P2.

When the lock member 212 is displaced from the initial position P1 to the terminal end position P2 or from the terminal end position P2 to the initial position P1, the external force is applied to the lock member 212 to allow the projections 224a, 224b of the lock member 212 to ride over the first and second minute projections 232, 234. The vibration, which is generated upon this operation, is transmitted to the fingers of the user. Therefore, the user can easily recognize the process (state) in which the lock member 212 is displaced from the initial position P1 to the communication groove 230, the process (state) in which the lock member 212 is displaced from the communication groove 230 to the terminal end position P2, the process (state) in which the lock member 212 is displaced from the terminal end position P2 to the communication groove 230, or the process (state) in which the lock member 212 is displaced from the communication groove 230 to the initial position P1. Thus, the operability is improved.

The lock member 212 has a V-groove which is formed on the outer circumference in order to indicate the rotation state (position) of the lock member 212. When the lock member 212 is at the initial position P1, the V-groove approximately coincides with an index to indicate the initial position P1 formed, for example, on the central portion 30 of the first tube joint member 12. When the lock member 212 is at the terminal end position P2, the V-groove approximately coincides with an index to indicate the terminal end position P2 formed, for example, on the central portion 30 of the first tube joint member 12 or on the outer circumference of the holder 210.

Next, an explanation will be made about a method for using the tube joint 10 according to the embodiment of the present invention. At first, starting from the state in which the second tube joint member 14 is not inserted into the first tube joint member 12, the external force is applied to the sleeve 16 to displace the sleeve 16 rearwardly with respect to the first tube joint member 12. Accordingly, the three-dimensionally shaped portions 136 of the chuck 20 are released from the pressed state having been effected by the sleeve 16. In this situation, the lock member 212 of the lock mechanism 200 is at the initial position P1.

In this state, as shown in FIG. 6, the second tube joint member 14 is inserted until the rear end surface thereof abuts against the base 60 of the main valve body 68 (see FIGS. 1 and 3). Further, when the second tube joint member 14 is pressed toward the first tube joint member 12, the collar 84 and the main valve body 68 are displaced rearwardly with respect to the first tube joint member 12. In this situation, the three-dimensionally shaped portions 136 of the chuck 20 arrive at the annular groove 108 formed on the second tube joint member 14, and they are engaged with the annular groove 108 by the aid of the resilience of the plate spring portions 132.

In this situation, the base 60 of the main valve body 68 is pressed rearwardly with respect to the first tube joint member 12. The O-ring 76, which is provided on the projection 66 of the main valve body 68, is separated from the movable member 72, giving a state in which the O-ring 76 is located approximately at the center of the central portion 30 (portion having the hexagonal cylindrical shape) of the first tube joint member 12. Thus, the valve plug 48 is in the open state.

Subsequently, when the external force is eliminated from the sleeve 16, the sleeve 16 is displaced frontwardly by being elastically urged by the compressive coil spring 18 until the front end of the engaging tab 204 of the sleeve 16 abuts against the rear end of the guide portion 216 of the holder 210 of the lock mechanism 200. The three-dimensionally shaped portions 136 of the chuck 20 are pressed in the directions directed to the axis of the second tube joint member 14 by the bent portion 202 of the sleeve 16. Owing to this pressing action, the three-dimensionally shaped portions 136 are reliably engaged in the annular groove 108, and the three-dimensionally shaped portions 136 consequently grip the second tube joint member 14. Accordingly, the second tube joint member 14 is tightly coupled to the first tube joint member 12.

In this situation, when the sleeve 16 is displaced frontwardly, the gap is formed between the end surface of the rear portion of the lock member 212 and the rear end surface of the sleeve 16.

After that, when the lock member 212 is rotated clockwise, the lock member 212 makes sliding movement frontwardly along the guide groove 220 of the holder 210 (see FIG. 1). At the stage at which the lock member 212 arrives at the terminal end position P2 as shown in FIG. 2, the front end surface of the rear portion of the lock member 212 arrives at the position approximate to the rear end surface of the sleeve 16 or the position to make contact therewith. In this situation, the projections 224a, 224b of the lock member 212 ride over the second minute projections 234 respectively, and they are retained at the terminal end position P2 by the second minute projections 234. Therefore, the rearward displacement of the sleeve 16 is limited. Accordingly, the first tube joint member 12 and the second tube joint member 14 are tightly coupled to one another.

Reversely, when the second tube joint member 14 is disengaged and separated from the first tube joint member 12, the lock member 212 is firstly rotated counterclockwise to make sliding movement until the lock member 212 is located at the initial position P1. Accordingly, the sleeve 16 is released and can be moved rearward.

Subsequently, the external force is applied to the sleeve 16, and the sleeve 16 is displaced rearwardly with respect to the first tube joint member 12. Thus, the three-dimensionally shaped portions 136 of the chuck 20 are released from the pressed state having been effected by the sleeve 16. During this process, the collar 84 and the main valve body 68 are resiliently urged by the compressive coil spring 70. The O-ring 76, which is provided on the projection 66 of the main valve body 68, abuts against the movable member 72 again. Accordingly, the sealing is effected between the main valve body 68 and the movable member 72, and the valve plug 48 is in the closed state.

The chuck 20 is tightly fixed to the first tube joint member 12, because the plate tabs 130 are engaged with the annular groove 44 of the first tube joint member 12. The chuck 20 is not disengaged and separated when the second tube joint member 14 is disengaged and separated.

As described above, according to the chuck concerning the embodiment of the present invention, the three-dimensionally shaped portion 136 has the strength, and it has the long service life, because the three-dimensionally shaped portion 136 is constructed to have the capsule-shaped three-dimensional configuration. Further, the annular ring portion 120 has the high strength, and it has the long service life as compared with those obtained by any machining or working such as the deep drawing, because the annular ring portion 120 can be formed by rounding the metal plate.

The three-dimensionally shaped portion 136 has the hollow interior. Therefore, the weight is light as compared with a case in which steel balls are used for the engaging portion.

The chuck 20 according to the embodiment of the present invention integrally comprises the annular ring portion 120, the first engaging portions 122 which extend from the annular ring portion 120 along the central axis m of the annular ring portion 120, and the second engaging portions 124 which extend from the annular ring portion 120 along the central axis m of the annular ring portion 120. Therefore, the number of part of the chuck 20 is one. Accordingly, the coupling operation, which is performed by using the chuck 20, is easy. It is possible to reduce the production cost of the part having the chuck 20.

Therefore, when the chuck 20 according to this embodiment is applied, for example, to the tube joint 10, it is possible to easily achieve the improvement in the production efficiency of the tube joint 10, the reduction of the production cost, the realization of the small size and the light weight of the tube joint 10, and the realization of the large flow amount of the tube joint 10.

The tube joint 10 has the chuck 20 for coupling the first and second tube joint members 12, 14, in which the second engaging portions 124 are elastically engaged with the second tube joint member 14. Therefore, the engagement with the second tube joint member 14 is not insufficient. It is unnecessary to use a plurality of steel balls which have been otherwise hitherto used.

The chuck 20 has the base of the annular ring portion 120 which is provided with the first engaging portions 122 for making engagement with the first tube joint member 12 and the second engaging portions 124 for elastically making engagement with the second tube joint member 14. These parts are constructed in an integrated manner.

It is unnecessary to use any steel balls as described above. Therefore, it is unnecessary to provide any additional member for holding the steel balls. It is possible to decrease the number of parts including the steel balls. As a result, the step of assembling the tube joint 10 is simplified, which makes it possible to reduce the production cost in cooperation with the reduction of the number of parts.

Further, it is unnecessary to adopt any structure for holding any additional member on the first tube joint member 12. Therefore, it is possible to shorten the length of the tube joint 10 in the axial direction. It is possible to realize the small size and the light weight of the tube joint 10 in cooperation with the reduction of the number of parts as described above.

For example, assuming that the thickness of the tube joint 10 is constant, it is possible to increase the tube diameter of the tube joint 10 since it is unnecessary to provide the additional member. Therefore, it is possible to realize the large flow amount.

In the embodiment of the present invention, the plate spring portions 132 for constructing the second engaging portions 124, which are included in the chuck 20, are provided on the annular ring portion 120 at mutually equal intervals. Therefore, the second tube joint member 14 is gripped by the plate spring portions 132 by the forces which are equivalent in all directions. The equivalent gripping secures the sealing performance between the collar 84 and the second tube joint member 14.

On the other hand, the plate tabs 130, which constitute the first engaging portions 122, are also provided on the annular ring portion 120 at equal intervals. Therefore, the chuck 20 is fixed to the first tube joint member 12 by the forces which are equivalent in all directions.

The chuck 20 is engaged with the second tube joint member 14 by the aid of the three-dimensionally shaped portions 136 which are provided at the ends of the plate spring portions 132. Therefore, the three-dimensionally shaped portions 136 are tightly engaged with the annular groove 108 formed on the second tube joint member 14 in the same manner as the conventional steel balls of the tube joint. Accordingly, the second tube joint member 14 is not disengaged and separated from the first tube joint member 12 even in the displacement process of the sleeve 16.

The valve plug 48, which is arranged in the first tube joint member 12, is made of the synthetic resin. Therefore, it is possible to make the tube joint 10 light.

The tube joint 10 is provided with the lock mechanism 200. Therefore, it is possible to avoid any unexpected rearward displacement of the sleeve 16 after coupling the first tube joint member 12 and the second tube joint member 14. Further, it is possible to tightly couple the first tube joint member 12 and the second tube joint member 14.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A chuck assembly comprising:
    a first member;
    a second member; and
    a chuck comprising:
    an annular ring portion into which at least said first member is inserted;
    a first engaging portion which extends from said annular ring portion along a central axis of said annular ring portion and which engages with said first member;
    a second engaging portion which extends from said annular ring portion along said central axis of said annular ring portion and which elastically engages with a recess of said second member; and
    a three-dimensionally shaped portion on an end of said second engaging portion, said three-dimensionally shaped portion including a pair of plastically deformed expanded portions formed by plastically deforming a metal plate, and wherein a bent and folded intermediate portion defining a crease is formed between said pair of plastically deformed expanded portions, so that respective concavities of said pair of plastically deformed expanded portions face each other.

2. The chuck assembly according to claim 1, wherein said annular ring portion is formed by rounding a metal plate and said metal plate has both ends which are not fixed to one another so that said both ends are displaceable circumferentially.

3. The chuck assembly according to claim 2, wherein said annular ring portion is installed to said first member while being diametrally expanded elastically.

4. The chuck assembly according to claim 1, wherein said first engaging portion includes a plurality of plate tabs which are provided on said annular ring portion; and
    said second engaging portion includes a plurality of plate spring portions which are provided on said annular ring portion and which are longer than said plate tabs of said first engaging portion.

5. The chuck assembly according to claim 4, wherein each of said plate spring portions has an inclined portion which is inclined toward said central axis of said annular ring portion.

6. The chuck assembly according to claim 1, wherein plate tabs of said first engaging portion are provided on said annular ring portion at equal intervals; and plate spring portions of said second engaging portion are provided on said annular ring portion at equal intervals at positions different from those of said plate tabs.

7. The chuck assembly according to claim 1, wherein said pair of plastically deformed expanded portions comprises an inner expanded portion and an outer expanded portion that are different in shape from each other.

8. The chuck assembly according to claim 1, wherein said expanded portions have convexly curved outer sides and concavely curved inner sides.

9. A tube joint comprising:

a first tube joint member;

a second tube joint member which is connectable to said first tube joint member;

a sleeve which is attached to a connecting portion between said first and second tube joint members and which is provided to couple and uncouple said first and second tube joint members;

a resilient member which urges said sleeve in a direction to couple said first and second tube joint members; and a chuck which engages said first tube joint member with said second tube joint member, wherein said chuck comprises:

an annular ring portion into which said first tube joint member is inserted;

a first engaging portion which extends from said annular ring portion along a central axis of said annular ring portion and which engages with said first tube joint member; and a second engaging portion which extends from said annular ring portion along said central axis of said annular ring portion and which elastically engages with said second tube joint member, wherein said annular ring portion is formed by rounding a metal plate so that both ends of said metal plate are disposed close to one another, and said both ends are not fixed to one another so that said both ends are displaceable in a circumferential direction, and wherein an end of said second engaging portion engages with a recess of said second tube joint member and forms a three-dimensionally shaped portion including a pair of plastically deformed expanded portions formed by plastically deforming a metal plate, and wherein a bent and folded intermediate portion defining a crease is formed between said pair of plastically deformed expanded portions so that respective concavities of said pair of plastically deformed expanded portions face each other.

10. The tube joint according to claim 9, wherein said annular ring portion is installed to said first tube joint member while being diametrally expanded elastically.

11. The tube joint according to claim 9, further comprising a lock mechanism which selectively limits displacement of said sleeve.

12. The tube joint according to claim 9, wherein a detachable protecting member made of synthetic resin is provided at an end of said sleeve.

13. The tube joint according to claim 9, wherein said expanded portions have convexly curved outer sides and concavely curved inner sides.

14. A tube joint comprising:

a first tube joint member;

a second tube joint member which is connectable to said first tube joint member;

a sleeve which is attached to a connecting portion between said first and second tube joint members and which is provided to couple and uncouple said first and second tube joint members;

a resilient member which urges said sleeve in a direction to couple said first and second tube joint members; and a chuck which engages said first tube joint member with said second tube joint member, wherein said chuck comprises:

an annular ring portion into which said first tube joint member is inserted;

a first engaging portion which extends from said annular ring portion along a central axis of said annular ring portion and which engages with said first tube joint member; and a second engaging portion which extends from said annular ring portion along said central axis of said annular ring portion and which elastically engages with said second tube joint member, wherein an end of said second engaging portion engages with a recess of said second tube joint member and forms a three-dimensionally shaped portion including a pair of plastically deformed expanded portions formed by plastically deforming a metal plate, and wherein a bent and folded intermediate portion defining a crease in said metal plate is formed between said pair of plastically deformed expanded portions, so that respective concavities of said pair of plastically deformed expanded portions face each other.

15. The tube joint according to claim 14, further comprising a lock mechanism which selectively limits displacement of said sleeve.

16. The tube joint according to claim 14, wherein a detachable protecting member made of synthetic resin is provided at a front end of said sleeve.

17. The tube joint according to claim 14, wherein said pair of plastically deformed expanded portions comprises an inner expanded portion and an outer expanded portion that are different in shape from each other.

18. The tube joint according to claim 13, wherein said expanded portions have convexly curved outer sides and concavely curved inner sides.

* * * * *